United States Patent
Lee et al.

(10) Patent No.: US 8,131,091 B2
(45) Date of Patent: Mar. 6, 2012

(54) METHOD AND APPARATUS FOR COMPRESSING TEXT AND IMAGE

(75) Inventors: Seung Soo Lee, Daejeon (KR); Seong Jun Shin, Daejeon (KR); Tae Uk Yang, Daejeon (KR); Jang Hong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1013 days.

(21) Appl. No.: 12/057,902

(22) Filed: Mar. 28, 2008

(65) Prior Publication Data

US 2009/0129684 A1    May 21, 2009

(30) Foreign Application Priority Data

Nov. 15, 2007 (KR) .......................... 10-2007-0116701

(51) Int. Cl.
  *G06K 9/36* (2006.01)
  *G06K 9/46* (2006.01)
(52) U.S. Cl. ........................... 382/232; 382/244
(58) Field of Classification Search ............ 382/176, 382/187, 188, 189, 232, 234, 244, 314, 315
See application file for complete search history.

(56) References Cited

U.S. PATENT DOCUMENTS 5,936,616 A * 8/1999 Torborg et al. ................ 345/555

FOREIGN PATENT DOCUMENTS

| KR | 10-0183195 B1 | 12/1998 |
| KR | 100237851 | 10/1999 |

* cited by examiner

*Primary Examiner* — Phuoc Tran
(74) *Attorney, Agent, or Firm* — Ladas & Parry LLP (57) ABSTRACT

Provided is a method and apparatus for compressing a text and an image. When compressing the text and image, it is possible to group valid lines with data into each line having a common element, and compress and encode the data of the valid lines. Accordingly, it is possible to reduce a data loss that may occur in a tactical communication environment with a poor channel state due to a bit sleep or a burst error. In the case of the text, it is possible to perform lossless compression on only a valid line with data and thereby improve compression efficiency. In the case of the image, it is possible to perform loss compression on valid lines, and then restore the partially damaged data using an ECC even when data is partially damaged. Accordingly, it is possible to improve compression efficiency and the entire data transmission success rate.

11 Claims, 6 Drawing Sheets

METHOD AND APPARATUS FOR COMPRESSING TEXT AND IMAGE

CROSS-REFERENCE TO RELATED APPLICATION

This application claims priority to and the benefit of Korean Patent Application No. 2007-116701, filed Nov. 15, 2007, the disclosure of which is incorporated herein by reference in its entirety.

BACKGROUND

1. Field of the Invention

The present invention relates to a method and apparatus for compressing a text and an image, and more particularly, to a method and apparatus for compressing a text and an image that can group text and image data into each line having a common element and independently compress the grouped data to thereby reduce a loss of data that may occur in a tactical communication environment with a poor channel state due to a bit sleep or a burst error.

2. Discussion of Related Art

Generally, if data of a predetermined document is transmitted or stored as is when transmitting or storing the document, the data capacity may be large. Therefore, a large amount of transmission time and memory capacity may be needed. However, if the document data is compressed and thereby transmitted or stored, the compressed data may be restored to original data using a predetermined restoration algorithm.

Conventional data compression algorithms are generally classified into a lossless compression algorithm and a loss compression algorithm. When compressing a text, the lossless compression algorithm such as a run-length code (RLC), a Huffman code, and the like is used. Conversely, when compressing an image, the loss compression algorithm such as a Joint Photographic Experts Group (JPEG), a Moving Picture Experts Group (MPEG), and the like is used. Specifically, depending on the type of input data, when the input data is a text, the lossless compression is used, and when the input data is an image, the loss compression is used.

However, in comparison to a general communication environment, a bit sleep or a burst error may frequently occur in a tactical communication environment of wired or wirelessly transmitting and receiving text data or image data using a telephone, an amplitude modulation (AM) radiotelegraph, a frequency modulation (FM) radiotelegraph, and the like. Moreover, a data transmission rate may be as low as hundreds of bps, and a data transmission success rate may also be very low.

SUMMARY OF THE INVENTION

The present invention is directed to a method and apparatus for compressing a text and an image that can group valid lines with data into each line having a common element when compressing a text and an image, compress the data of the valid lines, and encode the compressed data to thereby reduce a data loss that may occur in a tactical communication environment with a poor channel state due to a bit sleep or a burst error.

The present invention is also directed to a method and apparatus that can perform lossless compression on only a valid line with data when compressing a text to thereby improve compression efficiency.

The present invention is also directed to a method and apparatus that can perform loss compression on valid lines and then perform an error correction code (ECC) when compressing an image to thereby improve compression efficiency and restore even partially damaged data through the error correction, thereby increasing the entire data transmission success rate.

One aspect of the present invention provides a method of compressing a text and an image, including the steps of: a text compression step of, when compressing the text, selectively retrieving only a valid line with data and encoding the retrieved valid line for each line group through lossless compression; and an image compression step of, when compressing the image, encoding all valid lines for each line group through loss compression and performing an error correction code.

Another aspect of the present invention provides an apparatus for compressing a text and an image, including: a compression mode determining unit for receiving text or image data and determining a text compression mode or an image compression mode depending on a type of the received data; a valid line retrieving unit for retrieving a valid line with data when the determined mode is the text compression mode; a compression unit for compressing text data of the retrieved valid line using lossless compression when the determined mode is the text compression mode, and compressing image data of all valid lines using loss compression when the determined mode is the image compression mode; a grouping unit for grouping the valid lines into each line having a common element; a group encoding unit for encoding compressed data of the grouped valid lines for each group using a corresponding group key; and an ECC unit for performing an error correction code on the grouped compressed data when the determined mode is the image compression mode.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be performed in various forms. Therefore, the following embodiments are described in order for this disclosure to be complete and enabling to those of ordinary skill in the art.

Prior to describing the present invention, terms used in the present specification will be briefly described. The term "text" denotes a document that is generated using pen writing on a text screen or a liquid crystal display (LCD) screen. The term "image" denotes a still image such as a picture image.

Figure 1:
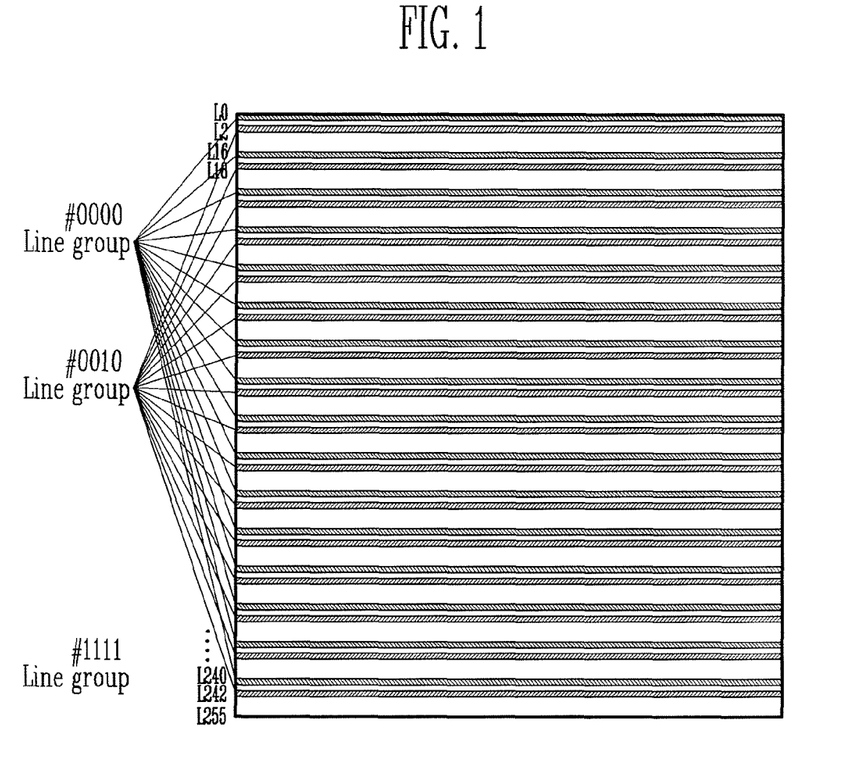
FIG. 1 illustrates a line group used for a method of compressing a text and an image according to the present invention.

FIG. 1 illustrates a line group used for a method of compressing a text and an image according to the present invention. In FIG. 1, lines having a common element on an LCD screen of a tactical communication terminal are grouped. The tactical communication terminal is capable of editing and transmitting the text and the image.

Referring to FIG. 1, it is assumed that the LCD screen consists of 256 lines. Lines having a common element are grouped and the grouped lines are set as a single independent line group.

For example, line group "#0000" is a group of lines that have the last four bits "0000" as the common element when the number of lines is represented as an 8-bit binary number. The line group "0000" includes a total of 16 lines. Accordingly, the entire 256 lines are grouped into 16 line groups.

Here, in the case of the text, the LCD screen consists of valid lines with data and invalid lines without data, and in the case of the image, the LCD screen consists of only valid lines.

Specifically, according to an aspect of the present invention, when compressing a text, only valid lines with data are selectively retrieved and compressed for each line group using lossless compression. When compressing an image, all valid lines are compressed for each line group using loss compression. Since a different compression method is applied depending on the text or the image, it is possible to improve a compression rate in a tactical communication environment.

In the case of the image, a bit map (BMP) image is compressed to a JPG file or a GIF file at the ratio of 10:1 using loss compression. Even though the JPG file or the GIF file has relatively good compression efficiency, the compressed data may not be readily decompressed when data is partially damaged.

In order to offset the above disadvantages, the present invention compresses the image to the JPG file or the GIF file using the loss compression, and then performs an ECC to enable restoration through the error correction even when data is partially damaged. Descriptions related thereto will be made later with reference to FIG. 3.

Figure 2:
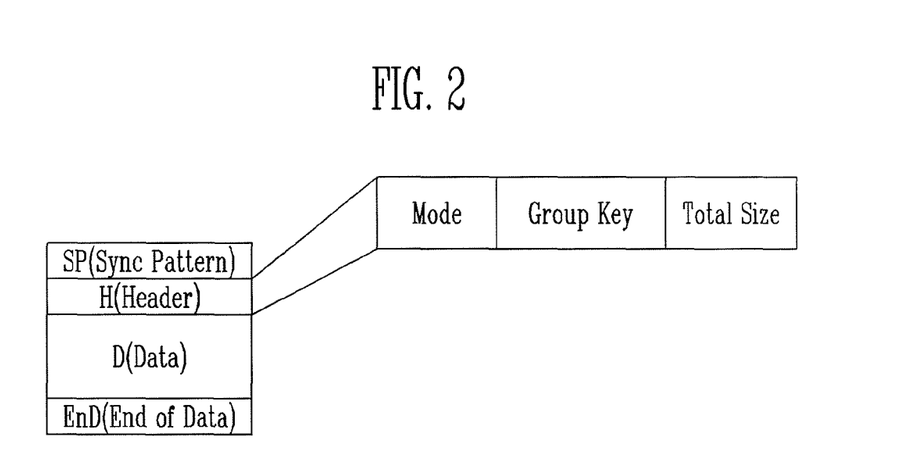
FIG. 2 illustrates a structure of a data frame for transmitting and receiving a text and image compressed by the method according to the present invention.

FIG. 2 illustrates a structure of a data frame for transmitting and receiving a text and image compressed by the method according to the present invention.

Referring to FIG. 2, the text and image data compressed using the compression method according to the present invention are included in a data field D of a data frame. A synchronous pattern field SP and a header field H are added in front of the data field D, and an end field EnD is added at the back of the data field D. Here, D denotes data, SP denotes a Sync Pattern, H denotes a Header, and EnD denotes End of Data.

The synchronous pattern field SP may define and use 64 bits of gold sequence with excellent autocorrelation properties. After the synchronous pattern field SP is translated, information of the header field H may be translated. If translation of the synchronous pattern field SP is not completed, a following procedure may not be performed.

The header field H includes mode information, group key information, and total size information. The mode information indicates a non-compression mode, a text compression mode, or an image compression mode. The group key information indicates key information used to encode/decode data.

The total size information indicates the entire data size such as a total number of lines and pages.

The end field EnD indicates the end of the data frame, and defines and uses "01011010(Hx5A)" pattern as an eight times consecutively repeated pattern.

Figure 3:
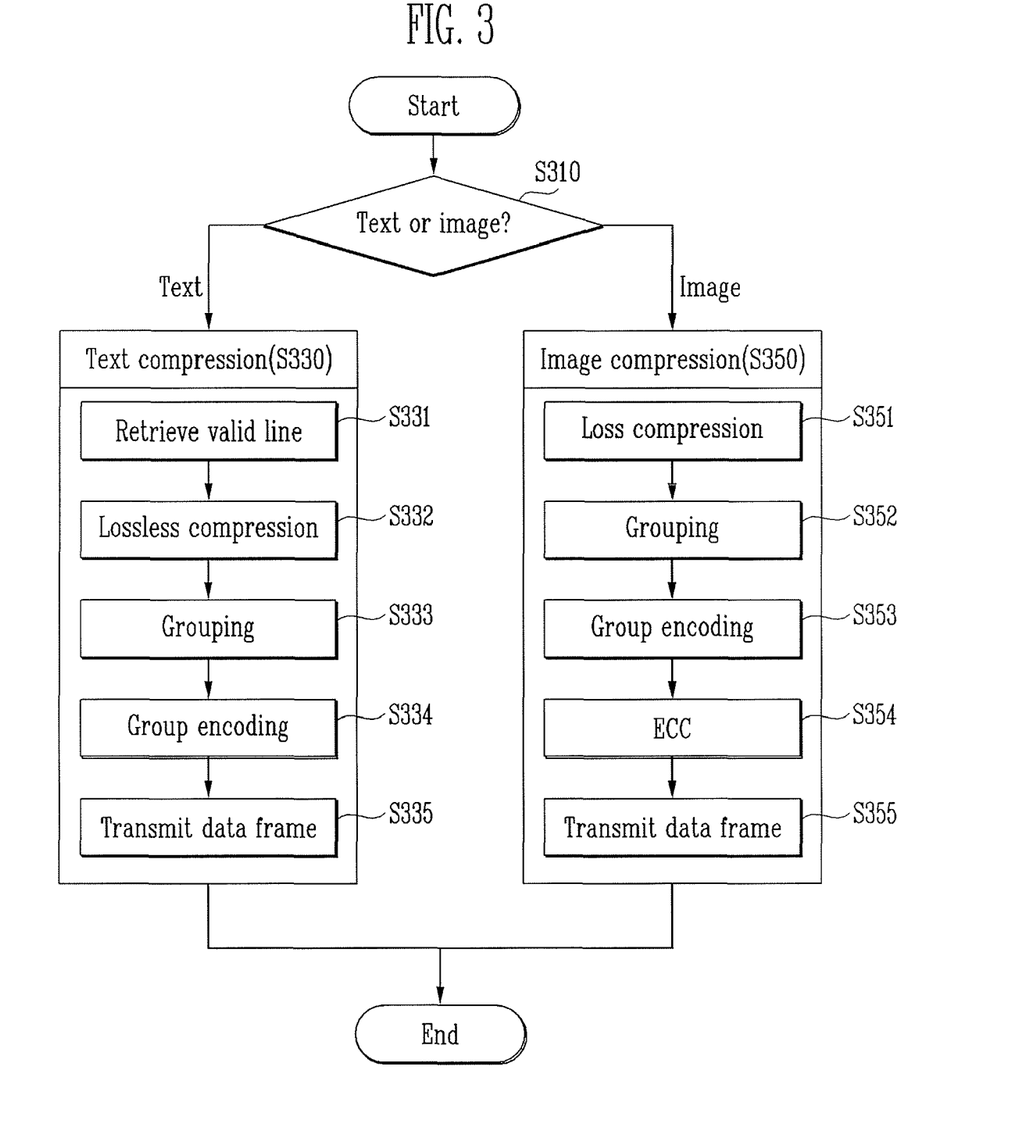
FIG. 3 is a flowchart illustrating a method of compressing a text and an image according to the present invention.

FIG. 3 is a flowchart illustrating a method of compressing a text and an image according to the present invention.

Referring to FIG. 3, the method according to the present invention includes a step (S310) of verifying whether data to be transmitted is a text or an image, a text compression step (S330) of, when the data is the text, selectively retrieving only a valid line with data and compressing the retrieved valid line for each line group through lossless compression, and an image compression step (S350) of, when the data is the image, compressing all valid lines for each line group through loss compression.

Hereinafter, the text compression step (S330) and the image compression step (S350) will be further described in detail.

(1) Text Compression Step (S330).

Figure 4:
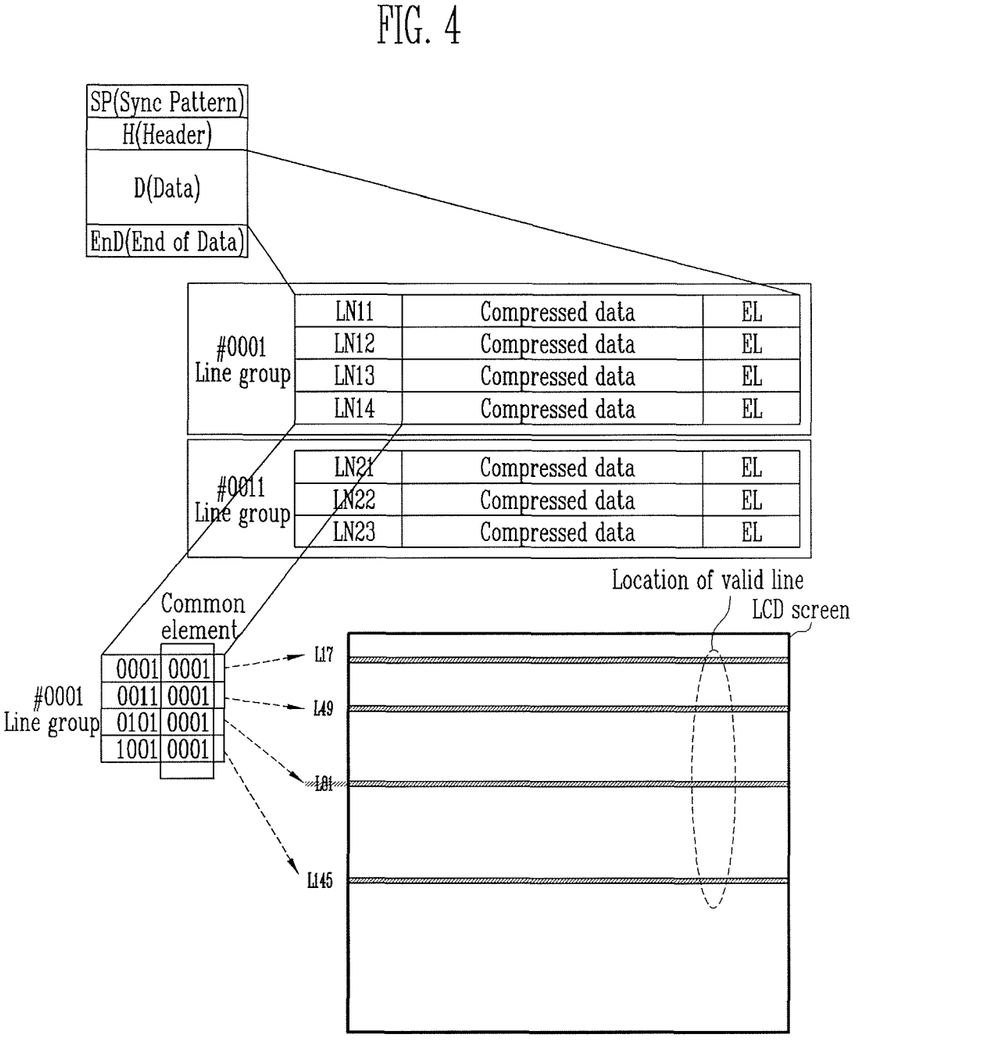
FIG. 4 illustrates a method of compressing a text according to the present invention.

FIG. 4 illustrates a method of compressing a text according to the present invention. Hereinafter, the text compression step (S330) of FIG. 3 will be further described in detail with reference to FIG. 4.

When data to be transmitted is the text, the valid line with data is retrieved from the entire LCD screen (S331).

It is assumed that four valid lines LN11, LN12, LN13, and LN14 having "0001" as a common element and three valid lines LN21, LN22, and LN23 having "0011" as the common element are retrieved as a result.

The data of the retrieved valid lines are compressed using a lossless compression method (S332). The lossless compression method may use a run-length code (RLC) or a Huffman code.

The valid lines having the common element are grouped (S333). According to grouping of the valid lines, the valid lines and compressed data of each valid line are arranged for each line group, as shown in FIG. 4. An EL tag is included in the end of the compressed data to indicate the end of the data. A value of the EL tag is defined and used in a "10011010 (Hx5A)" pattern.

Specifically, valid lines having a common element are constructed as a line group through grouping, and each line group has an independent group key.

For example, line group #0001 having "0001" as the common line includes the four valid lines LN11 through LN14, and the four valid lines LN11 through LN14 indicate that valid data exists in four lines L17, L49, L81, and L145 among a total of 256 lines. Specifically, each valid line indicates a location of a corresponding line including valid data in the LCD screen.

Each line group is encoded for each group using a corresponding group key (S334). The encoded line group is included in a data field D, and the data field D includes a synchronous pattern field SP, a header field H, and an end field EnD, and is transmitted (S335).

Specifically, in order to improve a data compression rate in comparison to a general compression method, the text compression method according to an aspect of the present invention may retrieve only a valid line with data before compression, compress only the data of the valid line for each group having a common element through lossless compression, and transmit the compressed data. Accordingly, the compression rate may be improved. Also, it is robust against a bit sleep or a burst error through group encoding.

(2) Image Compression Step (S350).

Figure 5:
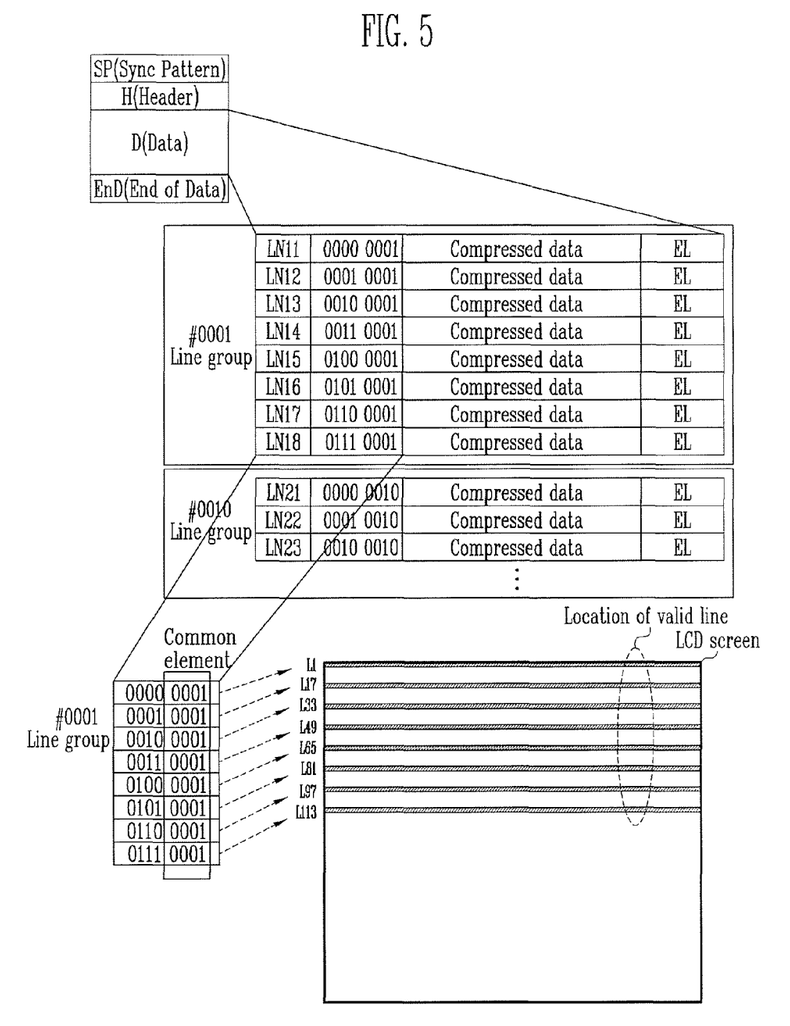
FIG. 5 illustrates a method of compressing an image according to the present invention.

FIG. 5 illustrates a method of compressing an image according to the present invention. Hereinafter, the image compression step (S350) of FIG. 3 will be further described in detail with reference to FIG. 5.

When data to be transmitted is an image, image data of all valid lines on the entire LCD screen are compressed using a loss compression method without retrieving a valid line with data, which is different from the text compression method. The loss compression method may use a JPG file or a GIF file.

Valid lines having the common element are grouped (S352). According to grouping of the valid lines, the valid lines and compressed data of each valid line are arranged for each line group, as shown in FIG. 5. An EL tag is included in the end of the compressed data to indicate the end of the data. A value of the EL tag is defined and used in a "01011010 (Hx5A)" pattern.

For example, when it is assumed that the entire screen is compressed to ½, line group #0001 having "0001" as the common element consists of eight lines L1, L17, L33, L49, L65, L81, L97, and L113. Also, line group #0010 consists of eight lines.

Each line group is encoded for each group using a corresponding group key (S353).

An ECC is performed on the encoded line group (S354). Here, the ECC may use a correctable 2-bit or 6-bit Bose, Chaudhuri, Hockquenghem (BCH) code.

Specifically, when compressing image data using the loss compression, the compression rate may be improved through the loss compression, whereas the risk of loss of the entire image data due to a transmission error may increase. For this, according to an aspect of the present invention, the ECC is performed. Accordingly, the compression rate may be improved and also the entire data transmission success rate may be improved.

For example, in the case of a 2 Mb-BMP file which is a still image, the BMP file may be compressed to a 400 Kb-JPG file using the loss compression and be transmitted as an about 800 Kb-file using a correctable 2-bit BCH code as an ECC.

The error corrected line group is included in a data field D, and the data field D includes a synchronous pattern field SP, a header field H, and an end field EnD, and is transmitted (S355).

As described above, the image compression method according to an aspect of the present invention may perform loss compression on image data and also restore the image data using the ECC even when the image data is partially damaged. Accordingly, the compression efficiency may be improved and also the entire data transmission success rate may be improved. Also, it is robust against a bit sleep or a burst error through group encoding.

Figure 6:
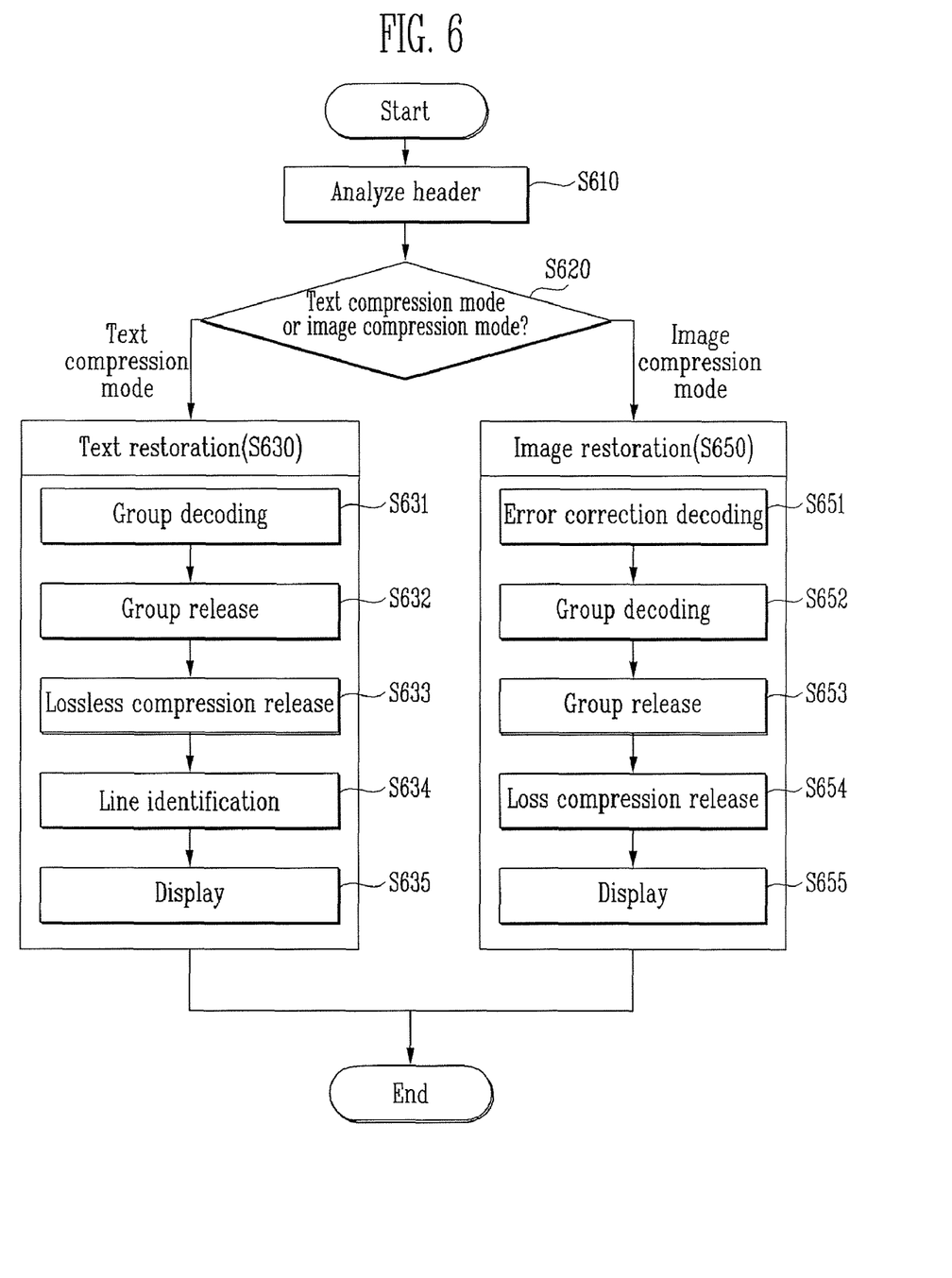
FIG. 6 is a flowchart illustrating a method of restoring a text and image compressed by the method according to the present invention.

FIG. 6 is a flowchart illustrating a method of restoring a text and image compressed by the method according to the present invention.

Referring to FIG. 6, the method includes a step (S610) of, when a data frame is received, analyzing a header of the received data frame, a step (S620) of verifying whether a compression mode is a text compression mode or an image compression mode depending on the result of analysis, a text restoration step (S630) of, when the mode is the text compression mode, restoring the compressed text through group decoding, group release, lossless compression release, and line identification, and an image restoration step (S650) of, when the mode is the image compression mode, restoring the compressed image through error correction decoding, group decoding, group release, and loss compression release.

Specifically, when the compression method of FIG. 3 is inversely performed, the compressed text and the compressed image are restored. Hereinafter, the text restoration step (S630) and the image restoration step (S650) will be briefly described.

When the mode is the text compression mode as the result of analysis, encoded text data is decoded for each group (S631). In this case, decoding is performed using group key information included in a header of the data frame. The group is released for each line (S632), and the lossless compression release is performed (S633). A line is identified from the group and is relocated to an original location (S634). The restored text is displayed on the LCD screen according to the relocated line (S635).

When the mode is the image compression mode as the result of analysis, the error correction decoding is performed (S651). Here, when the ECC is a BCH code, an error is correctable by two bits. The error corrected image data is decoded for each group (S652). In this case, decoding is performed using group key information included in a header of the data frame. The group is released for each line (S653), and the loss compression release is performed (S654). When the decompressed line is relocated to an original location, the restored image is displayed on the LCD screen according to the relocated line (S655).

As described above, according to an aspect of the present invention a compressed text and a compressed image may be decoded for each group and be restored by decompressing lines included in a corresponding group. Accordingly, it is possible to reduce a loss of data which may occur in a tactical communication environment with a poor channel state due to a bit sleep or a burst error. Also, in the case of the image, even when data is partially damaged, the data may be restored using error correction decoding.

Figure 7:
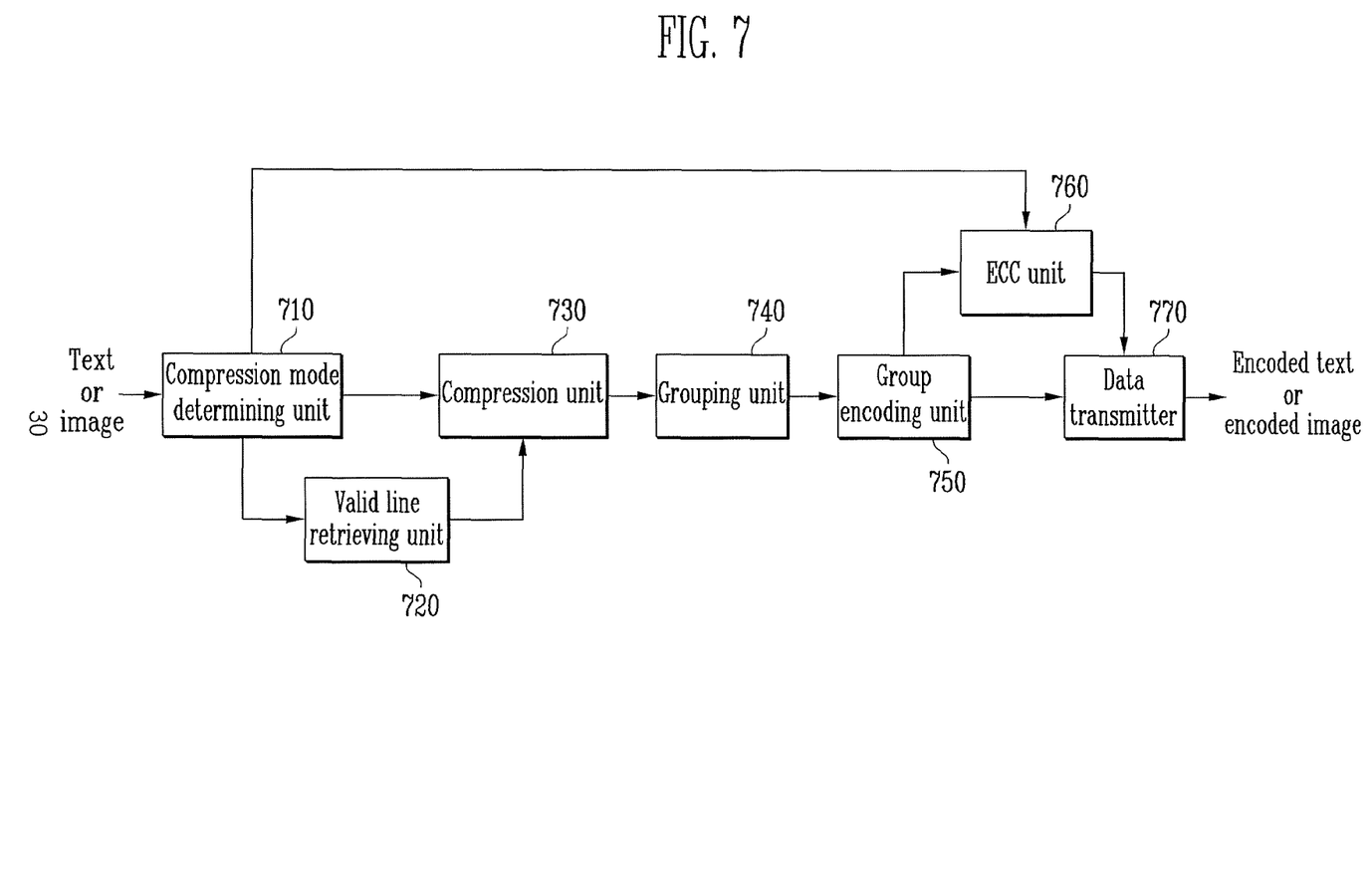
FIG. 7 is a block diagram of an apparatus for compressing a text and an image according to the present invention.

FIG. 7 is a block diagram of an apparatus for compressing a text and an image according to the present invention.

Referring to FIG. 7, the apparatus 700 includes a compression mode determining unit 710, a valid line retrieving unit 720, a compression unit 730, a grouping unit 740, a group encoding unit 750, an ECC unit 760, and a data transmitter 770.

The compression mode determining unit 710 receives text or image data and determines a text compression mode or an image compression mode depending on the type of received data. The determined compression mode is transferred to the valid line retrieving unit 720, the compression unit 730, and the ECC unit 760.

In the case of the text compression mode, the valid line retrieving unit 720 retrieves a valid line with data and transfers the result of retrieval to the compression unit 730.

Also, in the text compression mode, the valid line retrieving unit 720 compresses text data included in the retrieved valid line using lossless compression. Conversely, in the image compression mode, the valid line retrieving unit 720 compresses image data included in all valid lines using loss compression.

The grouping unit 740 groups valid lines into each line having a common element and outputs the result to the group encoding unit 750. Accordingly, the group encoding unit 750 encodes and outputs the compressed text or image data of the grouped valid lines using a corresponding group key.

In the image compression mode, the ECC unit 760 performs the ECC on the encoded data and outputs the result to the data transmitter 770.

In the text compression mode, the data transmitter 770 receives the encoded text data from the group encoding unit 750, and constructs a data frame as shown in FIG. 2, and thereby transmits the data frame. Conversely, in the image compression mode, the data transmitter 770 receives the error corrected image data from the ECC unit 760, and constructs a data frame as shown in FIG. 2, and thereby transmits the data frame.

As described above, according to an aspect of the present invention, when compressing a text and an image, the apparatus 700 for compressing the text and the image may apply a different compression method depending on a type of data. Accordingly, the compression efficiency may be improved. Also, the apparatus 700 may group compressed text and image data for each line having a common element, and independently encode and transmit the grouped data. Accordingly, it is possible to reduce a data loss that may occur in a tactical communication environment with a poor channel state due to a bit sleep or a burst error.

As described above, according to the present invention, when compressing a text and an image, it is possible to group valid lines with data for each line having a common element, and compress and encode the data of the grouped valid lines and thereby reduce a data loss that may occur in a tactical communication environment with a poor channel state due to a bit sleep or a burst error.

Also, according to the present invention, in the case of a text, it is possible to perform lossless compression on only a valid line with data and thereby improve compression efficiency.

Also, according to the present invention, in the case of an image, it is possible to perform loss compression on valid lines. Even when data is partially damaged, it is possible to restore the partially damaged data using an ECC. Accordingly, it is possible to improve compression efficiency and entire data transmission success rate.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of compressing a text and an image, comprising:
   compressing text by:
   selectively retrieving only valid lines with data for each line group of the text,
   compressing the data of the valid lines retrieved in the selectively retrieving using the lossless compression,
   grouping the valid lines retrieved in the selectively retrieving into each line having a common element to construct a line group, and
   encoding each line group for each group using a corresponding group key; and
   compressing an image by encoding all valid lines for each line group through loss compression and performing an error correction code.

2. The method of claim 1, wherein the grouping the valid lines retrieved in the selectively retrieving into each line having a common element to construct a line group further comprises:
   when constructing the line group, arranging the compressed data of the valid line obtained in the compressing the data of the valid line with respect to each valid line having the common element to include a tag in an end of the compressed data to indicate the end of the data.

3. A method of compressing a text and an image, comprising:
   compressing text by
   selectively retrieving only a valid line with data and encoding the retrieved valid line for each line group through lossless compression; and
   compressing an image by:
   encoding and compressing image data of all valid lines using loss compression,
   grouping all the valid lines into each line having the common element to construct a line group,
   encoding each line group for each group using a corresponding group key, and
   a performing the error correction code on the encoded line group.

4. The method of claim 3, wherein the grouping all the valid lines into each line having the common element to construct a line group further comprises:
   when constructing the line groups, arranging the compressed data of the valid line obtained in the compressing image data of all valid lines with respect to each valid line having the common element to include a tag in an end of the compressed data to indicate the end of the data.

5. The method of claim 3, wherein the performing the error correction code on the encoded line group, the error correction code is performed using a correctable 2-bit or 6-bit Bose, Chaudhuri, Hockquenghem (BCH) code.

6. A method of compressing a text and an image, comprising:
   compressing text by selectively retrieving only a valid line with data and encoding the retrieved valid line for each line group through lossless compression;
   compressing an image by encoding all valid lines for each line group through loss compression and performing an error correction code;
   including in a data field of a data frame, the compressed text data that is encoded for each line group in the text compression, or the compressed image data that is error-corrected and encoded for each line group in the image compression; and
   adding a synchronous pattern field and a header field in front of the data field and an end field at the back of the data field, and transmitting the data field.

7. The method of claim 6, wherein the header field comprises mode information indicating a non-compression mode, a text compression mode, and an image compression mode, group key information indicating key information used to encode/decode the data, and total size information indicating the total size of the data.

8. An apparatus for compressing a text and an image, comprising:
   a compression mode determining unit for receiving text or image data and determining a text compression mode or an image compression mode depending on a type of the received data;
   a valid line retrieving unit for retrieving a valid line with data when the determined mode is the text compression mode;
   a compression unit for compressing text data of the retrieved valid line using lossless compression when the determined mode is the text compression mode, and compressing image data of all valid lines using loss compression when the determined mode is the image compression mode;
   a grouping unit for grouping the valid lines into each line having a common element;

a group encoding unit for encoding compressed data of the grouped valid lines for each group using a corresponding group key; and an ECC unit for performing an error correction code on the grouped compressed data when the determined mode is the image compression mode.

9. The apparatus of claim 8, further comprising:

a data transmitter for including in a data field of a data frame, the compressed text data that is encoded for each group and is output from the group encoding unit, or the compressed image data that is error-corrected and encoded for each group and is output from the ECC unit, and transmitting the data field.

10. The apparatus of claim 8, wherein the data transmitter adds a synchronous pattern field and a header field in front of the data field and an end field at the back of the data field, and transmits the data field.

11. The apparatus of claim 10, wherein the header field comprises mode information indicating a non-compression mode, a text compression mode, and an image compression mode, group key information indicating key information used to encode/decode the data, and total size information indicating the total size of the data.

* * * * *